(12) United States Patent
Amin et al.

(10) Patent No.: US 6,417,962 B1
(45) Date of Patent: Jul. 9, 2002

(54) OPTICAL WAVEGUIDE AMPLIFIER OPTICAL SERVICE CHANNEL ACCESSOR DEVICE AND METHOD OF MAKING

(75) Inventors: Jaymin Amin, Corning, NY (US); James M. Harris, Huntington Beach, CA (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/611,926

(22) Filed: Jul. 7, 2000

Related U.S. Application Data

(60) Provisional application No. 60/142,607, filed on Jul. 7, 1999.

(51) Int. Cl.[7] .................................................. H01S 3/00
(52) U.S. Cl. ................................. 359/341.1; 359/349
(58) Field of Search .......................... 385/42; 359/333, 359/125, 341.1, 349, 495, 634, 638; 372/703

(56) References Cited

U.S. PATENT DOCUMENTS

| | | | |
|---|---|---|---|
| 5,778,132 A | * 7/1998 | Csipkes et al. | 385/135 |
| 5,917,635 A | * 6/1999 | Cvijetic et al. | 359/179 |
| 5,930,038 A | * 7/1999 | Swan | 359/484 |
| 6,288,810 B1 | * 9/2001 | Grasso et al. | 359/127 |
| 6,292,289 B1 | * 9/2001 | Sugaya et al. | 359/337 |
| 6,353,497 B1 | * 2/2002 | Zhang et al. | 359/341.1 |

* cited by examiner

Primary Examiner—Thomas H. Tarcza
Assistant Examiner—Deandra Hughes
(74) Attorney, Agent, or Firm—Svetlana Short (57) ABSTRACT

An optical waveguide optical amplifier device for use with an optical telecommunications system that transmits optically amplifiable subscriber channels and communicates service information internally within the system with optical service channels and includes an optical amplifier input, an amplifier output, and optical amplifier medium. The optical amplifier input includes a reflective isolator longitudinal body with a first end and a second end. The first end includes an input fiber for receiving the subscriber and optical service channels inputted into the amplifier input and an output fiber for transmitting the subscriber channels to the amplifier medium. The second end of the reflective isolator body includes an optical service channel accessor which guides the subscriber channels to the output optical fiber. The amplifier device further includes an optical service channel receiver connected to the optical service channel accessor such that an optical service channel that enters the reflective isolator body from the input fiber is transmitted through the optical service channel accessor to the receiver and away from the output fiber.

33 Claims, 7 Drawing Sheets

OPTICAL WAVEGUIDE AMPLIFIER OPTICAL SERVICE CHANNEL ACCESSOR DEVICE AND METHOD OF MAKING

This application claims the benefit of priority under 35 U.S.C. §120 of U.S. Provisional Patent Application No. 60/142,607, filed Jul. 7, 1999.

BACKGROUND OF THE INVENTION

1. Field of the Invention

The present invention relates generally to and particularly to optical waveguide telecommunications, optical amplifiers and optical waveguide devices.

2. Technical Background

The present invention relates generally to optical telecommunications systems, and more particularly to optical waveguide devices utilized in optical telecommunications systems.

Optical telecommunications systems consist of multiple operation stations spaced distances apart. Usually the operation stations are separated by a distance of several kilometers and are connected together with optical fibers. The main purpose for constructing an optical telecommunications systems is usually to communicate information in an optical format over long distances that exceed the distances separating neighboring operation stations in the system. In addition to communicating such information to entities or subscribers outside of the system, the complexity of optical telecommunications now requires that information be communicated within the system and between the operation stations to insure proper service, maintenance and operation of the system. Within the system such information is communicated between the stations using optical service channels. Optical service channels can for example allow human operators at the stations to talk to each other without accessing the wavelength channels used to transmit information to points outside the system. Additionally optical service channels can be used to control automated components such as computers and related attachments at a station from another distant station or central operations location. Optical service channels also relay service and maintenance information to the stations so that the system operates smoothly and avoids malfunctions which could interrupt service through the system.

Optical amplifiers are important components used in such optical fiber telecommunications systems and are part of the ever growing complexity of the system that has made optical service channel communications a benefit for such systems. Optical signals transmitted in optical fibers tend to weaken as they travel along the optical fibers. Optical amplifiers provide an economic means of amplifying such weakened optical signals while maintaining the optical nature of the signal, thus allowing communications over long distances.

Erbium doped optical fiber amplifiers have become the dominant means of amplifying optical signals in the 1550 nm optical telecommunications window. Such erbium doped optical fiber amplifiers are normally directly pumped with 980 nm and/or 1480 nm semiconductor pump lasers. With such an amplifier-pump system, electrical energy applied to the 980 nm (1480 nm) semiconductor pp laser produces 980 nm (1480 nm) photons which are coupled through an optical fiber pigtail into the erbium doped optical fiber. The 980 nm and/or 1480 nm pump light excites/energizes the erbium ions in the erbium doped optical fiber so that 1550 nm optical telecommunications signals are amplified by the excited/energized erbium ions.

The optical amplifier and optical telecommunications industry needs a technology which allows for proper operation of the optical amplifiers and allows for the communications of beneficial optical service information.

SUMMARY OF THE INVENTION

One aspect of the present invention is an optical waveguide optical amplifier device for use with an optical telecommunications system that transmits optically amplifiable subscriber channels and communicates service information internally within the system with optical service channels and includes an optical amplifier input, an amplifier output, and optical amplifier medium. The optical amplifier input includes a reflective isolator longitudinal body with a first end and a second end. The first end includes an input fiber receiving the subscriber and optical service channels inputted into the amplifier input and an output fiber transmitting the subscriber channels to the amplifier medium. The second end of the reflective isolator body includes an optical service channel accessor which guides the subscriber channels to the output optical fiber. The amplifier device further includes an optical service channel receiver connected to the optical service channel accessor such that an optical service channel that enters the reflective isolator body from the input fiber is transmitted through the optical service channel accessor to the receiver and away from the output fiber.

In another aspect, the present invention includes a multi-channel optical amplifier for a telecommunications system that transmits at least eight separate optically amplifiable subscriber channels to the exterior of the system and communicate internally desirable service information for the system with at least one optical service channel within the system. The amplifier includes an amplifier input, an amplifier output, and an amplifier medium positioned between the amplifier input and the amplifier output, the amplifier medium optically amplifying the at least eight subscriber channels; and an optical service channel receiver receiving the optical service channel information. The amplifier input includes a reflective isolator body with a first end and a distant opposing second end. The first end includes an input optical fiber and an output optical fiber proximate the input fiber. The input fiber receives the at least eight subscriber channels and the optical service channel, and the output fiber outputs and guides the at least eight subscriber channels to the amplifier medium. The second end of the isolator body includes an optical service channel accessor which guides the optical service channel away from the first end and to the optical service channel receiver and also guides the at least eight subscriber channels back to the first end and into the output fiber.

In a further aspect, the present invention includes a optical waveguide telecommunications device for use with a dense multi-channel communications system which transmits subscriber data via optically amplifiable subscriber channels and utilizes a desired optical service channel different from the subscriber channel to communicate service information desired internally within the system. The device includes a reflective isolator longitudinal body with a first end and a digital opposing second end. The first end includes an input fiber and an output fiber adjacent to the input fiber. The second end includes an optical service channel accessor which transmits the optical service channel through the second end and away from the first end, and diverts all light outside of the optical service channel back to the first end. The device includes an optical service channel optical coupler adjacent and integral with the second end. The optical service channel optical coupler couples the optical service channel from the accessor to an optical service channel receiver pigtail waveguide.

The invention further includes a method of making an optical waveguide optical amplifier for use with a telecommunications system that transmits subscriber channels and communicates service information within the system with an optical service channel. The method includes: providing an amplifier output outputting subscriber channels, providing an amplifier medium amplifying the subscriber channels, coupling the output to the amplifier medium, providing an optical service channel receiver receiving the optical service channel, and providing an amplifier input. The step of providing an amplifier input includes providing a reflective isolator body having a first end and a second end, the first end including an input optical fiber for receiving the subscriber channels and the optical service channel, and an output fiber for transmitting the subscriber channels to the amplifier medium. The second end includes an optical service channel accessor which transmits the optical service channel to an optical service channel waveguide and guides the subscriber channels to the output fiber at the first end. The method further includes the step of coupling the output fiber to the amplifier medium and coupling the optical service channel waveguide to the optical service channel receiver.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE PREFERRED EMBODIMENTS

Figure 1:
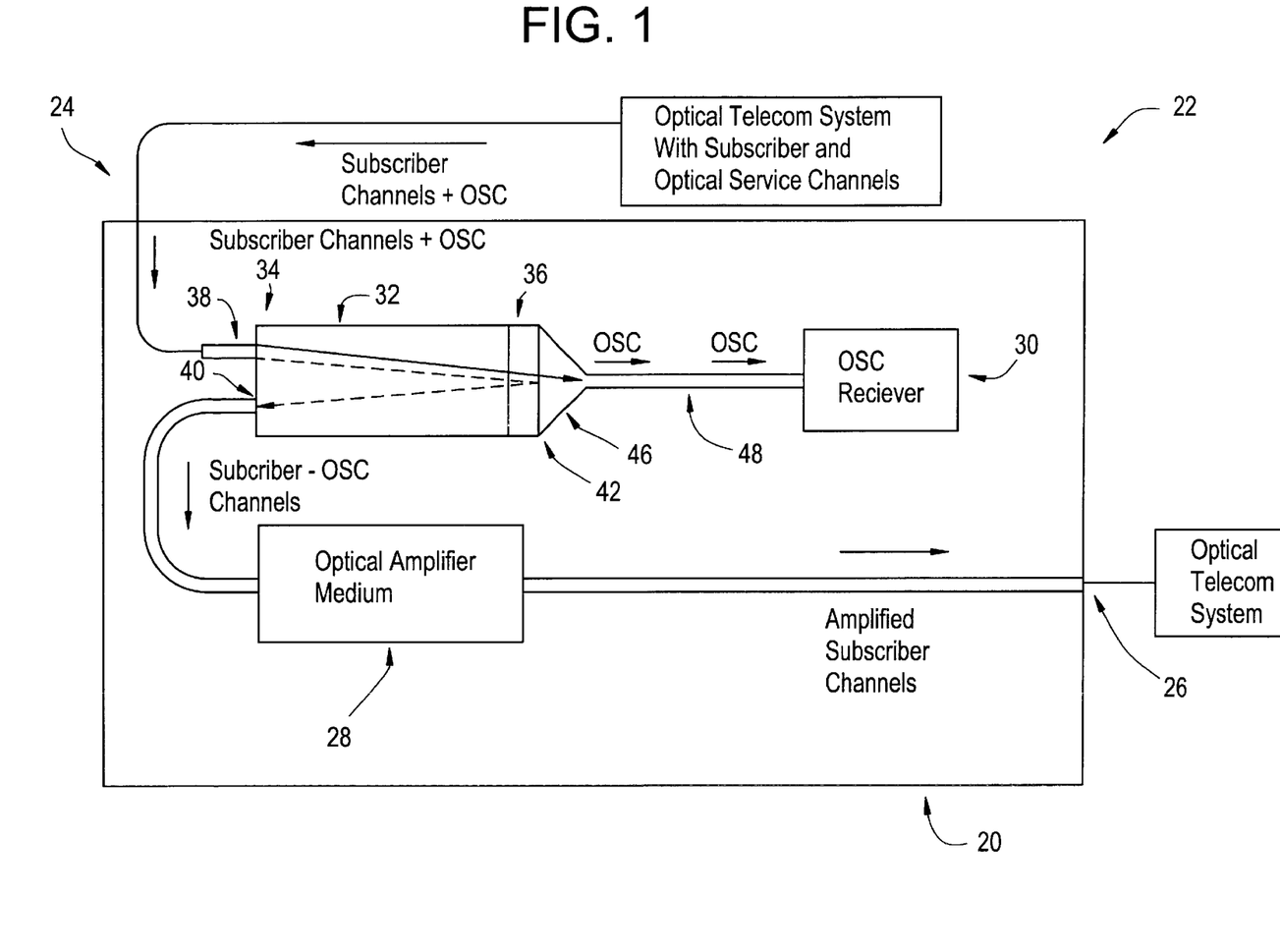
FIG. 1 is a diagrammatic depiction of the invention.

Reference will now be made in detail to the present preferred embodiments of the invention, examples of which are illustrated in the accompanying drawings. Wherever possible, the same reference numbers will be used throughout the drawings to refer to the same or like parts. An exemplary embodiment of the optical waveguide optical amplifier device is shown in FIG. 1, and is designated generally throughout by reference numeral 10.

In accordance with the invention, the present invention for an optical waveguide optical amplifier device includes an optical amplifier input with a reflective isolator longitudinal body having a first end and a distal opposing second end with the first end including an input optical fiber and the second end including an optical service channel accessor for transmitting optical service channels to an optical service channel receiver and guiding subscriber channels to the output optical fiber.

The invention includes an optical waveguide optical amplifier device for use with an optical telecommunications system that transmits optically amplifiable subscriber channels and communicates service information desired internally within the optical telecommunications system via an optical service channel. The amplifier device is particularly well suited for systems that transmit a large number of subscriber channels such as systems with 4, 8, 16, 32 and more optically amplifiable subscriber channels. Optical waveguide optical amplifier device 20 is shown in FIG. 1 in junction with optical telecommunications system 22. Amplifier device 20 includes an optical amplifier input 24, an optical amplifier output 26 and an optical amplifier medium 28 which optically amplifies optically amplifiable subscriber channels inputted through amplifier input 24 and then outputted through amplifier output 26. In a preferred embodiment optical amplifier medium 28 is an erbium doped optical waveguide fiber pumped by semiconductor pump lasers with pump output pump lasers with pump output wavelengths centered about wavelengths such as 980 nm and 1480 nm which are capable of optically pumping the erbium doped amplifier medium. The inventor further utilizes an optical amplifier optical service channel receiver 30 which receives the optical service channel service information that is desired internally within the optical telecommunications system 22. Optical amplifier input 24 includes a reflective isolator longitudinal body 32 which has a first end 34 and a distal opposing second end 36. Reflective isolator first end 34 includes an input optical waveguide fiber 38 which receives and guides the optically amplifiable subscriber channels and optical service channel inputted into amplifier input 24. Isolator first end 34 also includes an output optical waveguide fiber 40 which transmits and guides the subscriber channels to amplifier medium 28. Reflective isolator longitudinal body second end 36 includes optical service channel accessor 42 which transmits the optical service channel to optical service channel receiver 30 and guides the optically amplifiable subscriber channels to output optical fiber 40.

Figure 2:
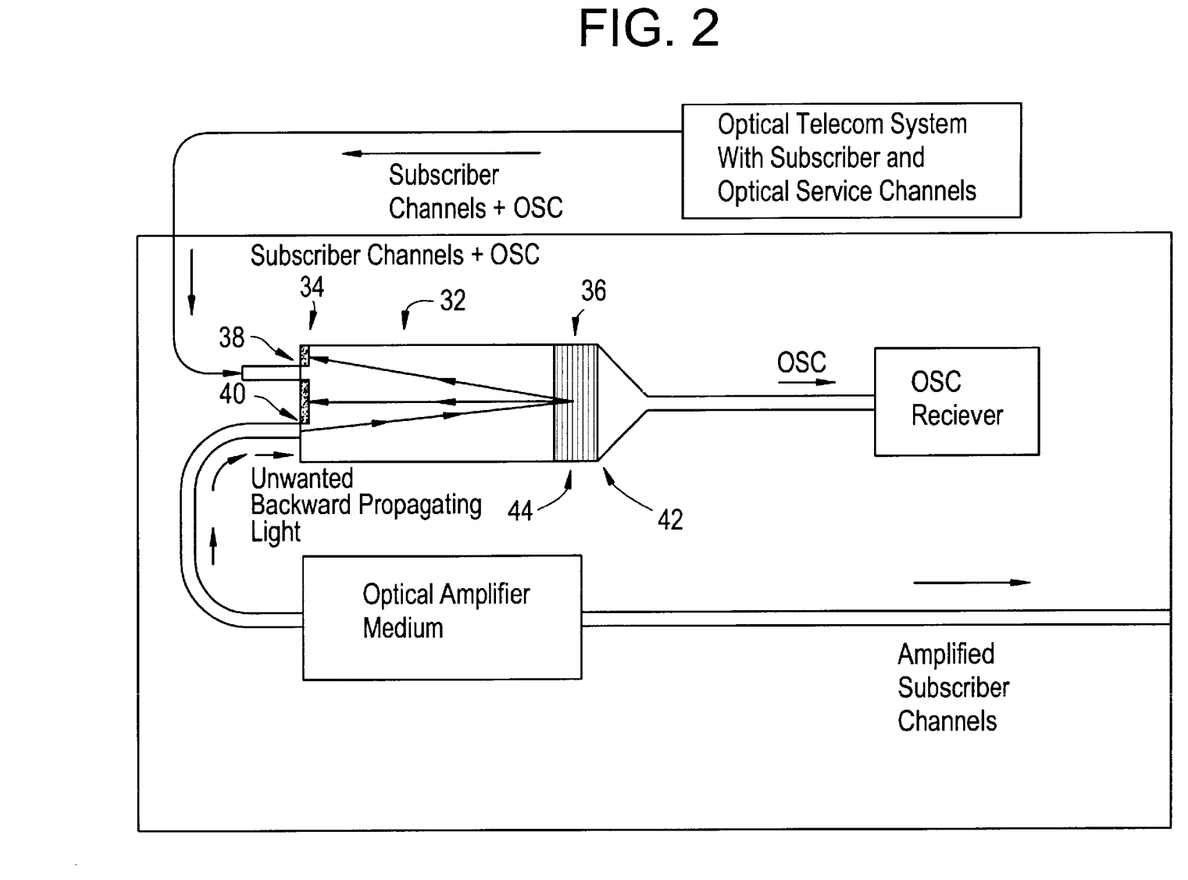
FIG. 2 is a diagrammatic depiction of the invention.

Reflective isolator 32 is comprised of isolator components such as polarization splitters, polarization rotators, and polarization combiners which allow forward transmission of light but attenuate backward transmission of light. As shown in FIG. 2, reflective isolator longitudinal body 32 inhibits light transmission from output optical fiber 40 to input optical fiber 38. Reflective isolator 32 prevents unwanted backward propagating light entering isolator 32 through output optical fiber 40 from coupling into input optical fiber 38 but transmits and guides the subscriber channels from input optical fiber 38 into output optical fiber 40.

Optical service channel accessor 42 isolator 32 deflects all wavelengths of light excluded from the optical service channel. The optical service channel is made up of a plurality (band) of optical service channel wavelengths. Optical service channel accessor 42 deflects all wavelengths of light except the optical service channel wavelengths. Preferably optical service channel accessor 42 guides at least eight optically amplifiable subscriber channels from output fiber 38 to output optical fiber 40. It is more preferable that the number of optically amplifiable subscriber channels be at least sixteen and, most preferably, at least thirty-two. Isolator 32 inhibits unwanted backward propagating light with optical service channel accessor 42 deflecting all wavelengths of light excluded from the optical service channel. All wavelengths of light excluded from the optical service channel that are emitted from output fiber 40 and reach optical service channel accessor 42 are deflected back toward reflective isolator longitudinal body first end 34. Preferably the optical service channel wavelengths are centered about 1510 nm, and most preferably include wavelengths from about 1505 nm to about 1515 nm. Preferably the plurality of optical amplifiable subscriber channels include wavelengths within the range from about 1530 nm to about 1625 nm, and most preferably including wavelengths within the range from about 1530 nm to about 1565 nm. Additionally, the subscriber channels can be in the range from about 1565 nm to about 1625 nm. Within these ranges there are a large number of channels, for example eight, sixteen, and thirty-two channels.

The invention further includes a multi-channel optical amplifier for an optical telecommunications system that transmits at least eight separate optically amplifiable subscriber channels to the exterior of the system and communicates a plurality of internally desirable service information for the system with at least one optical service channel which is utilized internally within the system. Multi-channel optical amplifier 20 includes optical amplifier input 24, optical amplifier output 26, and optical amplifier medium 28 between input 24 and output 26. Optical amplifier medium 28 optically amplifies at least eight subscriber channels. Optical service channel receiver 30 receives the optical service channel and the internally desirable service information. Amplifier input 24 includes a reflective isolator body 32 with first end 34 and distal opposing second end 36. First end 34 includes input optical fiber 38. Input fiber 38 receives and guides at least eight subscriber channels and the optical service channel. Isolator first end 34 further includes output optical fiber 40 proximate to input optical fiber 38. Output fiber 40 guides the at least eight subscriber channels to amplifier medium 28. Isolator body distal opposing second end 36 includes an optical service channel accessor which guides the optical service channel light away from first end 34 to optical service channel receiver 30 and guides the at least eight subscriber channels back to first end 34 and into output optical fiber 40. Preferably the at least eight optically amplifiable subscriber channels are in the range from about 1530 nm to about 1625 nm and the optical service channel is centered about 1510 nm. The optical service channel is made up of a plurality of optical service channel wavelengths and preferably optical service channel accessor 42 includes a series of coatings 44 which are reflective to all wavelengths of light except the optical service channel wavelengths which are transmitted through series of coatings 44 to optical service channel receiver 30. Preferably the optical amplifier input reflective isolator body is a unitary integral assembly of input optical fiber 38 and 40 with reflective isolator body first end 34 and optical service channel accessor 42 with reflective isolator body second end 36. In a further embodiment optical service channel wavelengths traveling in a direction from optical service channel receiver 30 towards first end 34 are inhibited from coupling into output optical fiber 40.

Figure 3:
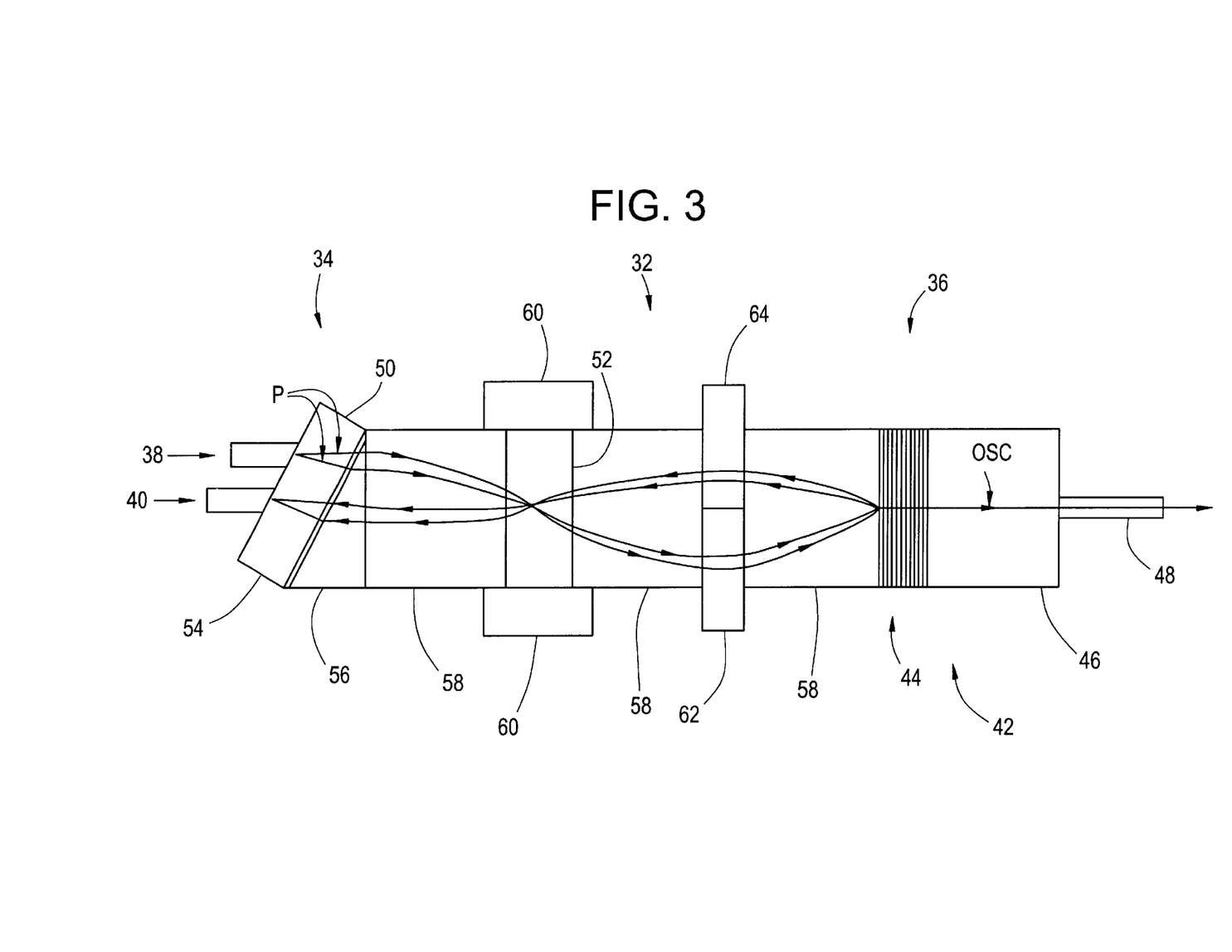
FIG. 3 is a side cross-section of an embodiment of the invention illustrating light paths.

The invention further includes an optical waveguide telecommunications optical service channel accessor isolator device for use with a dense multichannel optical waveguide telecommunications system which transmits subscriber data via a plurality of optically amplifiable subscriber channels and which utilizes a desired optical service channel different from the subscriber channels to communicate service information desired internally within the optical waveguide telecommunications system. FIG. 3 shows embodiments of the optical waveguide optical service channel accessor isolator device. The optical waveguide device includes a reflective polarization independent isolator longitudinal body 32 having a first end 34 and a distal opposing second end 36. Isolator body first end 34 includes input optical fiber 38 adjacent to output optical fiber 38. Isolator body second end 36 includes optical service channel accessor 42 which transmits the optical service channel through second end-36 and away from isolator first end 34 and diverts all light outside of the optical service channel back to isolator first end 34. The optical waveguide device and optical service accessor further include optical service channel optical coupler 46. Optical service channel optical coupler 46 is adjacent and unitarily integrated with second end 36 of isolator body 32. Optical service channel optical coupler 46 couples the optical service channel from accessor 42 to optical service channel pigtail waveguide 48 which provides for guiding the optical service channel to an optical service channel receiver and is used for pigtail connection with optical service channel receiver 30. Optical service channel accessor 42 is comprised of an optical medium which transmits the optical service channel and diverts the subscriber channels back towards isolator first end 34. Preferably the accessor optical medium is a series of optical coatings 44 which are substantially reflective to all wavelengths of light outside of the optical service channel. Preferably the thicknesses of the series of coatings 44 correlate to wavelengths of light outside of the optical service channel.

Reflective isolator longitudinal body includes a polarization splitter 50, a magnetooptic polarization Faraday non-reciprocal rotator 52 which irreversibly rotates the plane of polarization, and a polarization combiner 54 disposed between first end 34 and second end 36 such that light outside of the optical service channel that is inputted into the isolator through input optical fiber 38 is transmitted through longitudinal body 32 to optical service channel accessor 42, diverted by accessor 42 back towards first end 34 and transmitted through longitudinal body 32 and outputted through output fiber 40. Preferably optical service channel wavelengths traveling in a direction from optical service channel pigtail waveguide 48 towards output fiber 40 are substantially attenuated and not coupled into output fiber 40. The components of isolator 32 (splitter 50, rotator 52, combiner 54) are arranged for optical isolation such that light outside of the optical service channel which enters the isolator through output fiber 40 is not transmitted through isolator longitudinal body 32 to input optical fiber 38. Optical service channel optical coupler 46 may comprise an optical waveguide which guides the optical service channels transmitted through optical service channel accessor 42 to pigtail 48 and a preferable optical coupler 46 is a graded index lens. Preferably optical service channel accessor transmits optical service channel wavelengths centered about 1510 nm.

Figure 4:
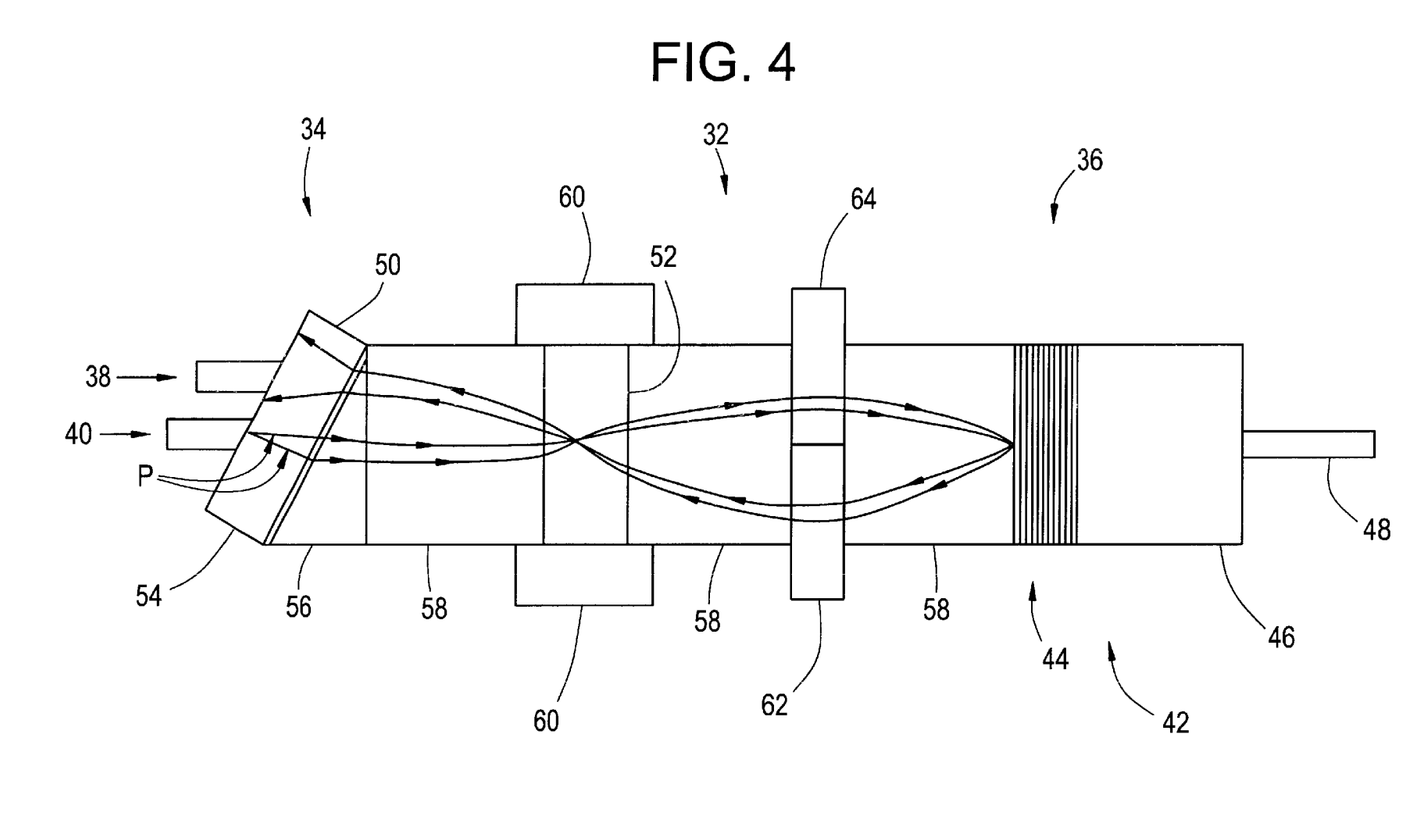
FIG. 4 is a side cross-section of an embodiment of the invention illustrating light paths.

An embodiment of the inventive device is shown in FIGS. 3–4 which illustrate explanatory light path rays. Light entering isolator body 32 through input fiber 38 is split into orthogonal linearly polarized rays P by polarization splitter 50 which comprises a birefringement plate. The split rays travel through triangle prism 56 and converging rod lens 58 and into polarization rotator 52 which is a magnetooptic Faraday rotator that rotates the plane of polarization when acted upon by surrounding magnet 60. The rotated split rays then travel through lenses 58 and birefringent plate 62 towards second end 36 and accessor 42. Birefringent plate 62 spatially displaces by $\sqrt{2}$ the extraordinary split ray P. Optical service channel wavelengths OSC present in the light entering through input fiber 38 are transmitted through series of coatings 44 of optical service channel accessor 42 and coupled through coupler 46 into optical service channel pigtail 48. Light outside of the optical service channel is reflected at second end 36 by the series of coatings 44 of accessor 42 back towards first end 34. The reflected non-optical service channel light travels through lenses 58 and birefringent plate 64 which spatially displaces by $\sqrt{2}$ the extraordinary split ray. The reflected non-optical service channel light is rotated by polarization rotator 52, travels through lens 58 and prism 56 and is recombined by polarization combiner 54 (which is the same birefringent plate of splitter 50) and outputted through output fiber 40. FIG. 4 illustrates the isolator function in that light entering isolator body 32 through output fiber 40 is split into orthogonal linearly polarized rays P by birefringent plate splitter 50, reflected at second end 36 by accessor 42 and is not recombined by birefringent plate combiner and is not outputted through input fiber 38.

Figure 5:
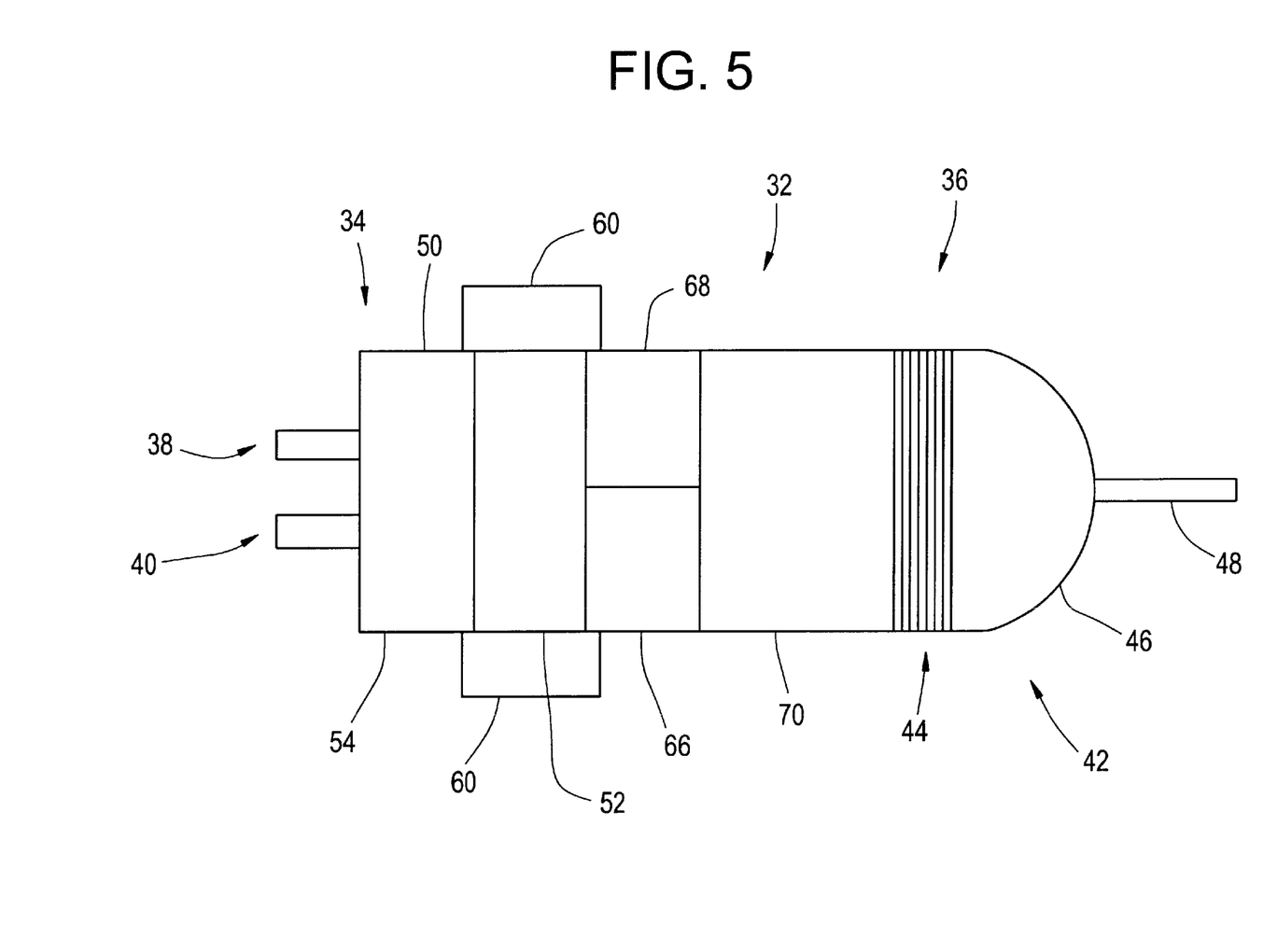
FIG. 5 is a side cross-section view of an embodiment of the invention.

An embodiment of the inventive device is shown in FIG. 5. Light entering isolator body 32 through input fiber 38 is split by birefringent crystal polarization splitter 50 into the two polarization states which are physically separated polarized rays. Polarization rotator 52 with magnet 50 rotates the two separated rays by 45° in that rotator 52 is a non-reciprocal Faraday rotator. The separated rotated rays travel through first $\sqrt{2}$ thickness birefringent crystal 66 wherein one of the rays is physically shifted. Lens 70 directs the rays to optical service channel accessor 42. Optical service channel accessor reflects all wavelengths of light outside of the optical service channel. Light within the optical service channel is transmitted through series of coatings 44 and coupled into optical service channel pigtail 48 with optical service channel coupler 46. The reflected light travels back towards first end 34, with second $\sqrt{2}$ thickness birefringent crystal 68 shifting one of the reflected rays. Birefringent crystals 68 and 66 have a thickness that is $\sqrt{2}$ times as thick as the birefringent crystal that comprises splitter 50. The separated rays are again then rotated by rotator 52 and then combined into a single beam by birefringent crystal polarization combiner 54 which is coupled into output fiber 40. Isolator body 32 functions such that light entering isolator body 32 from output fiber 40 is not guided and transmitted into input fiber 38.

Figure 6:
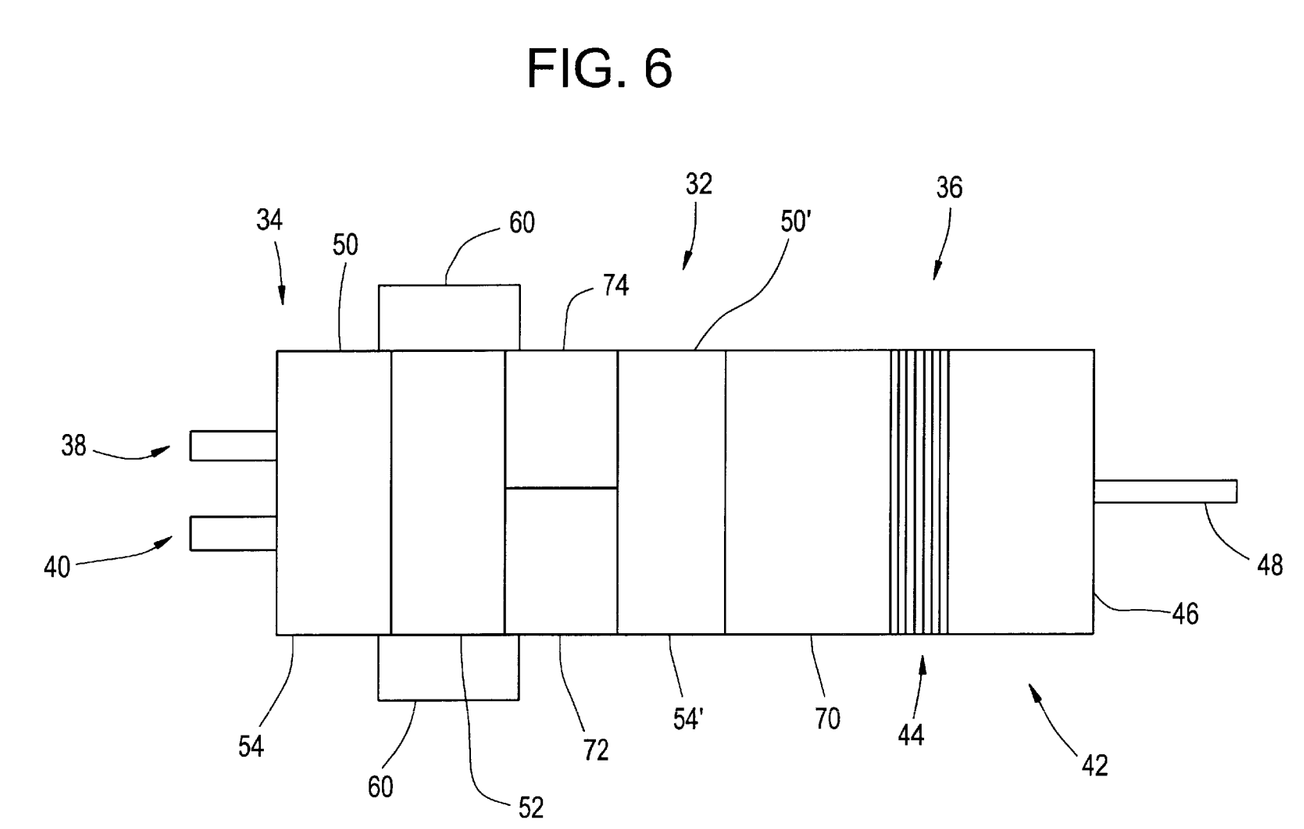
FIG. 6 is a side cross-section view of an embodiment of the invention.

An embodiment of the inventive device is shown in FIG. 6. Light entering isolator body 32 through input fiber 38 is split by birefringent crystal polarization splitter 50, rotated 45° by Faraday polarization rotator 52, travel through first quarter-waveplate (+22.5°) 72, and into second birefringent crystal polarization combiner/splitter 54'/50' which combines the two separated nonreflected rays traveling towards second end 36. Lens 70 directs the light to accessor 42 which reflects all light outside of the optical service channel back towards first end 34 and transmits the optical service channel into pigtail 48. Optical service channel accessor 42 and the series of optical channel accessor coatings 44 reflect all light outside of the optical service channel. The reflected light travels back towards first end 34 through lens 70, through second birefringent crystal polarization combiner/splitter 54'/50' which separates the reflected light into two polarization states. One of the separated rays travels through first quarter-waveplate (+22.5°) 72 and the other ray travels through second quarter waveplate (−22.5°) 74. Faraday polarization rotator 52 then rotates the separated rays which are then combined by birefringent crystal polarization combiner 54 and guided into output fiber 40. Similarly, isolator body 32 functions in the reverse (non transmitting direction) such that light entering through output fiber 40 is not guided into input fiber 38.

Figure 7:
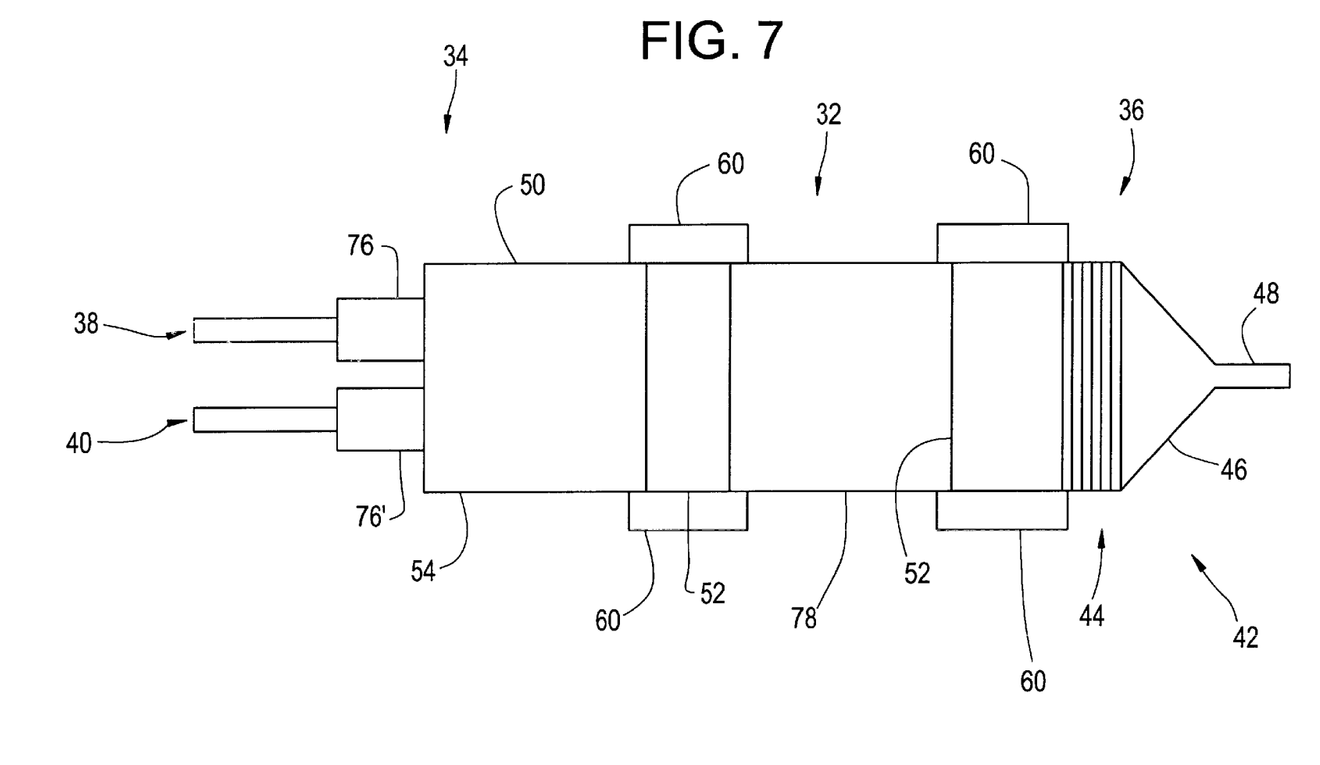
FIG. 7 is a side cross-section view of an embodiment of the invention.

An embodiment of the inventive device is shown in FIG. 7. Light enters isolator body 32 from input fiber 38 through rod lens 76 and is split into the two polarization rays by birefringent crystal polarization splitter 50 which are then Faraday rotated by polarization rotator 52. Two stacked birefringent crystal displacement member 78 is disposed between this first rotator 52 and the second rotator 52. Two stacked birefringent crystal displacement member 78 is made of two separate birefringent crystals stacked on top of each other, in parallel, have the same length and are each half the width of rotators 52 that they are sandwiched between. The beam displacement axis of the two stacked crystals of displacement member 78 are parallel to each other but are opposed so that member 78 allows for displacement of rays in opposite directions. Both of the separated rotated rays travel towards second end 36 through one of the stacked birefringent crystals of member 78 such that only one ray is displaced. the second Faraday polarization rotator 52 rotates the rays a second time before reaching optical service channel accessor 42. Accessor 42 reflects substantially all wavelengths of light outside of the optical service channel and couples the optical service channel to pigtail 48. Light outside of the optical service channel is guided back to first end 34 and rotated a third time by second Faraday polarization rotator 52. One of the reflected polarization rays travels through one of the stacked crystals member 78 undisplaced, while the other reflected polarization ray travels through the other crystal member 78 and is spatially displaced. The reflected light is then rotated a fourth time by first Faraday polarization rotator 52 and then recombined by birefringent polarization combiner 54 and guided into lens 76 and into output fiber 40. Similarly, light traveling in the non-transmitting direction that enters through output fiber 40 is not guided into input fiber 38.

The invention includes a method of making an optical waveguide optical amplifier device for use with an optical telecommunications system that transmits a plurality of optically amplifiable subscriber channels and communicates a plurality of service information desired internally within the optical telecommunications system via an optical service channel. The method includes providing an optical amplifier output 26 for outputting the optically amplifiable subscriber channels, providing an optical amplifier medium 28 for optically amplifying the optically amplifiable subscriber channels, and coupling the optical amplifier output 26 to the optical amplifier medium 28. The method includes providing an optical amplifier optical service channel receiver for receiving the optical service channel. The method includes providing an optical amplifier input 24 which includes a reflective isolator longitudinal body 32 having a first end 34 and a distal opposing second end 36, with first end 34 with an input optical fiber 38 for receiving the subscriber and optical service channels and an output optical fiber 40 for transmitting the optical amplifiable subscriber channels to medium 28, and second end 36 including an optical service channel accessor 42 which transmits the optical service channel in a continuing forward direction to the optical service channel waveguide and guides the subscriber channels in a reverse direction to output optical fiber 40. The method includes coupling output optical fiber 40 of optical amplifier input 24 to optical amplifier medium 28. The method further includes coupling the optical service channel waveguide to the optical service channel receiver.

Preferably, providing an optical amplifier input includes providing isolator body 32 with an optical service channel accessor 42 in which substantially all wavelengths of light excluded from the optical service channel which are traveling in a direction from first end 34 toward second end 36 are deflected back toward first end 34 by accessor 42.

The method preferably includes providing an isolator 32 with a polarization splitter, polarization rotator, and a polarization combiner disposed between first end 34 and second end 36 such that all light outside of the optical service channel that is inputted into amplifier input 24 through input optical fiber 38 is guided through isolator body 32 toward optical service channel accessor 42, diverted by accessor 42, and guided back towards output optical fiber 40. Light outside of the optical service channel which enters isolator body 32 through output optical fiber 40 is not transmitted to input optical fiber 38. Preferably the method includes providing an optical service channel accessor 42 which includes a series of coatings 44 which are substantially reflective to all wavelengths of light outside of the optical service channel.

The method further includes connecting amplifier input 24 and amplifier output 26 to an optical telecommunications system that transmits a plurality of optically amplifiable subscriber channels which includes wavelengths within the range of 1530 nm to 1625 nm and which communicates within the system with an optical service channel that is centered about 1510 nm.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical waveguide optical amplifier device for use with an optical telecommunications system that transmits a plurality of optically amplifiable subscriber channels and communicates a plurality of service information desired internally within the optical telecommunications system via an optical service channel, said amplifier device comprising:
   (i) an optical amplifier input;
   (ii) an optical amplifier output, and an optical amplifier medium between said amplifier input and said amplifier output, said amplifier medium optically amplifying said optically amplifiable subscriber channels;
   (iii) an optical amplifier optical service channel receiver which receives said service information desired internally within the optical telecommunications system;
   (iv) wherein said optical amplifier input comprises:
      (a) a reflective isolator longitudinal body having a first end and a distal opposing second end, said first end including an input optical fiber, said input optical fiber receiving said optically amplifiable subscriber channels and said optical service channel inputted into said optical amplifier input, said reflective isolator longitudinal body first end further comprising an output optical fiber, said output optical fiber transmitting said optical amplifiable subscriber channels to said optical amplifier medium; and
      (b) said reflective isolator longitudinal body second end including an optical service channel accessor which transmits said optical service channel to said service channel receiver and guides said optically amplifiable subscriber channels to said output optical fiber.

2. The device as claimed in claim 1, wherein said reflective isolator longitudinal body inhibits light transmission from said output optical fiber to said input optical fiber.

3. The device as claimed in claim 1, wherein said optical service channel accessor guides at least eight optically amplifiable subscriber channels to said output optical fiber.

4. The device as claimed in claim 1, wherein said optical service channel accessor deflects all wavelengths of light excluded from said optical service channel.

5. The device as claimed in claim 1, wherein said optical service channel is comprised of a plurality of optical service channel wavelengths, and said optical service channel accessor deflects all wavelengths of light except said optical service channel wavelengths.

6. The device as claimed in claim 2, wherein said optical service channel accessor deflects all wavelengths of light excluded from said optical service channel, and all wavelengths of light excluded from said optical service channel that are emitted from said output optical fiber and reach said optical service channel accessor are deflected back towards said reflective isolator longitudinal body first end.

7. The device as claimed in claim 5, wherein said plurality of optical service channel wavelengths are centered about 1510 nm.

8. The device as claimed in claim 7, wherein said plurality of optical service channel wavelengths include from 1505 nm to 1515 nm.

9. The device as claimed in claim 8, wherein said plurality of optical amplifiable subscriber channels include wavelengths within the range from 1530 nm to 1625 nm.

10. The device as claimed in claim 8, wherein said plurality of optical amplifiable subscriber channels include wavelengths within the range from 1530 nm to 1565 nm.

11. The device as claimed in claim 8, wherein said plurality of optical amplifiable subscriber channels include wavelengths within the range from 1565 nm to 1625 nm.

12. The device as claimed in claim 9, wherein said plurality of amplifiable subscriber channels comprises at least sixteen optical amplifiable subscriber channels.

13. A multi-channel optical amplifier for an optical telecommunications system that transmits at least eight separate optically amplifiable subscriber channels to the exterior of said system and communicates a plurality of internally desirable service information for said system with an optical service channel which is utilized internally within said system, said optical amplifier comprising:
   (i) an optical amplifier input;
   (ii) an optical amplifier output, and an optical amplifier medium positioned between said amplifier input and amplifier output, said amplifier medium optically amplifying said at least eight optically amplifiable subscriber channels;
   (iii) an optical service channel receiver which receives said optical service channel and internally desirable service information;
   (iv) said optical amplifier input including:
      a reflective isolator body having a first end and a distal opposing second end, said first end including an input optical fiber, said input optical fiber receiving said at least eight optically amplifiable subscriber channels and said optical service channel, said reflective isolator longitudinal body first end further comprising an output optical fiber proximate said input optical fiber, said output optical fiber guiding said at least eight optically amplifiable subscriber channels to said optical amplifier medium, said isolator body distal opposing second end comprised of an optical service channel accessor which guides said optical service channel away from said isolator body first end and to said optical service channel receiver, and which guides said at least eight optically amplifiable subscriber channels back to said first end and into said output optical fiber.

14. An optical amplifier as claimed in claim 13 wherein said at least eight optically amplifiable subscriber channels are in the range from 1530 nm to 1625 nm and said optical service channel is centered about 1510 nm.

15. An optical amplifier as claimed in claim 13, wherein said optical service channel comprises a plurality of optical service channel wavelengths and wherein said optical service channel accessor includes a series of coatings which are reflective to all wavelengths of light except said optical service channel wavelengths which are transmitted through said series of coatings to said optical service channel receiver.

16. An optical amplifier as claimed in claim 13 wherein said optical amplifier input reflective isolator body is a unitary integral assembly of said input optical fiber and said output optical fiber with said reflective isolator body first end and said optical service channel accessor with said reflective isolator body second end.

17. An optical amplifier as claimed in claim 13, wherein said optical service channel comprises of a plurality of optical service channel wavelengths and any optical service channel wavelengths traveling in a direction from said optical service channel receiver towards said first end are inhibited from coupling into said output optical fiber.

18. An optical waveguide telecommunications device for use with a dense multi-channel optical waveguide telecommunications system which transmits subscriber data via a plurality of optically amplifiable subscriber channels and which utilizes a desired optical service channel different from the subscriber channels to communicate service information desired internally within the optical waveguide telecommunications system; said device comprising:
  (i) a reflective isolator longitudinal body having a first end and a distal opposing second end, said first end including an input optical fiber and an output optical fiber adjacent to said input optical fiber;
  (ii) said reflective isolator longitudinal body distal second end comprising an optical service channel accessor which transmits said optical service channel through said reflective isolator longitudinal body distal second end and away from said reflective isolator longitudinal body first end, and diverts all light outside of said optical service channel back to said reflective isolator longitudinal body first end; and
  (iii) an optical service channel optical coupler, said optical service channel optical coupler adjacent and integrated with said second end of said reflective isolator longitudinal body, said optical service channel optical coupler coupling said optical service channel from said accessor to an optical service channel pigtail waveguide, said optical service channel pigtail waveguide for guiding connection to a said optical service channel to an optical service channel receiver.

19. A device as claimed in claim 18, wherein said optical service channel accessor comprises an optical medium which transmits said optical service channel and diverts said subscriber channels.

20. A device as claimed in claim 18, wherein said reflective isolator longitudinal body includes a polarization splitter, a polarization rotator, and a polarization combiner disposed between said first end and said second end such that light outside of said optical service channel that is inputted into said device through said input optical fiber is transmitted through said longitudinal body to said optical service channel accessor, diverted by said optical service channel accessor back towards said first end, and transmitted through said longitudinal body and outputted from said device through said output optical fiber.

21. A device as claimed in claim 18, said optical service channel comprised of a plurality of optical service channel wavelengths, wherein optical service channel wavelengths traveling in a direction from said optical service channel pigtail waveguide towards said output optical fiber are substantially attenuated.

22. A device as claimed in claim 21, wherein light outside of said optical service channel which enters said device through said output optical fiber is not transmitted through said longitudinal body to said input optical fiber.

23. A device as claimed in claim 18, wherein said optical service channel optical coupler comprises an optical waveguide which guides said optical service channels transmitted through said optical service channel accessor to said optical service channel pigtail waveguide.

24. A device as claimed in claim 23, wherein said optical service channel optical coupler optical waveguide comprises a graded index lens.

25. A device as claimed in claim 18, wherein said optical service channel accessor comprises a series of coatings which are substantially reflective to all wavelengths of light outside of said optical service channel.

26. A device as claimed in claim 25, wherein the thicknesses of said series of coatings correlate to wavelengths of light outside of said optical service channel.

27. A device as claimed in claim 18 wherein said optical service channel is centered about 1510 nm.

28. A method of making an optical waveguide optical amplifier device for use with an optical telecommunications system that transmits a plurality of optically amplifiable subscriber channels and communicates a plurality of optically amplifiable subscriber channels and communicates a plurality of service information desired internally within the optical telecommunications system via an optical service channel, said method comprising:
  (i) providing an optical amplifier output for outputting said optically amplifiable subscriber channels;
  (ii) providing an optical amplifier medium for optically amplifying said optically amplifiable subscriber channels;
  (iii) coupling said optical amplifier output to said optical amplifier medium;
  (iv) providing an optical amplifier optical service channel receiver for receiving said optical service channel;
  (v) providing an optical amplifier input, said optical amplifier input including a reflective isolator longitudinal body having a first end and a distal opposing second end, said first end including an input optical fiber, said input optical fiber for receiving said optically amplifiable subscriber channels and said optical service channel, said first end further comprising an output of optical fiber for transmitting said optical amplifiable subscriber channels to said optical amplifier medium, said second end including an optical service channel accessor which transmits said optical service channel to an optical service channel waveguide and guides said optically amplifiable subscriber channels to said output optical fiber;

(vi) coupling said output optical fiber of said optical amplifier input to said optical amplifier medium; and (vii) coupling said optical service channel waveguide to said optical service channel receiver.

29. A method as claimed in claim 28, wherein substantially all wavelengths of light excluded from said optical service channel which are traveling within said optical amplifier input in a direction from said first end towards said second end are deflected back towards said first end by said optical service channel accessor.

30. A method as claimed in claim 28, wherein providing an optical amplifier input including a reflective isolator longitudinal body further comprises providing a reflective isolator longitudinal body which includes:

(i) a polarization splitter;

(ii) a polarization rotator; and (iii) a polarization combiner such that all light outside of said optical service channel that is inputted into said optical amplifier input through said input optical fiber id guided through said longitudinal body towards said optical service channel accessor, diverted by said optical service channel accessor and guided towards said optical output fiber.

31. A method as claimed in claim 30, wherein light outside of said optical service channel which enters said longitudinal body through said output optical fiber is not transmitted to said input optical fiber.

32. A method as claimed in claim 28, wherein providing an optical amplifier input including an optical service channel accessor further comprises providing an optical service channel accessor which includes a series of coatings which are substantially reflective to all wavelengths of light outside of said optical service channel.

33. A method as claimed in claim 28, further comprising connecting said optical amplifier input and said optical amplifier output to an optical telecommunications system that transmits a plurality of optically amplifiable subscriber channels which includes wavelengths within the range from 1530 nm to 1625 nm and which communicates within the system with an optical service channel that is centered about 1510 nm.

* * * * *